United States Patent
Maurin

(10) Patent No.: US 6,571,583 B1
(45) Date of Patent: Jun. 3, 2003

(54) DEVICE FOR DRAWING AN OPTICAL FIBER INCLUDING A MORE ACCURATE DIAMETER MEASURING SENSOR

(75) Inventor: Laurent Maurin, Loison-sous-Lens (FR)

(73) Assignee: Alcatel, Paris (FR)

( * ) Notice: Subject to any disclaimer, the term of this patent is extended or adjusted under 35 U.S.C. 154(b) by 297 days.

(21) Appl. No.: 09/119,448

(22) Filed: Jul. 21, 1998

(30) Foreign Application Priority Data

Jul. 24, 1997 (FR) .............................. 97 09417

(51) Int. Cl.⁷ .............................. C03B 37/01
(52) U.S. Cl. ........................... 65/485; 65/491
(58) Field of Search ................... 65/485, 491, 382

(56) References Cited

U.S. PATENT DOCUMENTS

| | | | | |
|---|---|---|---|---|
| 5,208,645 A | * | 5/1993 | Inoue | 65/491 |
| 5,314,517 A | * | 5/1994 | Koening | 65/385 |
| 5,417,733 A | * | 5/1995 | Wesson | 65/485 |
| 5,558,692 A | * | 9/1996 | Chervenak | 65/485 |
| 5,841,524 A | * | 11/1998 | Floch | 65/485 |

FOREIGN PATENT DOCUMENTS

| EP | 0294889 A1 | 12/1988 |
|---|---|---|
| EP | 0736747 A1 | 10/1996 |

OTHER PUBLICATIONS

Merriam Webster's Collegiate DIctionary, 10th edition (1997) p. 1187.*

* cited by examiner

Primary Examiner—John Hoffmann

(57) ABSTRACT

A device draws an optical fiber from one end of a preform melted by a furnace, an optical sensor being disposed a the exit from the furnace to measure the diameter of the optical fiber for the purpose of adjusting the tension with which the optical fiber is drawn. The sensor is surrounded by a mask in two parts joined at two pairs of edges to form a dark chamber through which the optical fiber passes. The mask protects the optical sensor from radiation from ambient light sources, especially rays emitted by the furnace, which cause localized measurement artifacts. It improves the accuracy of measurement of the diameter of the optical fiber leading, by eliminating artifacts, to a reduction in the number of times the optical fiber is cut.

4 Claims, 2 Drawing Sheets

DEVICE FOR DRAWING AN OPTICAL FIBER INCLUDING A MORE ACCURATE DIAMETER MEASURING SENSOR

BACKGROUND OF THE INVENTION

1. Field of the Invention

The invention concerns a device for drawing an optical fiber from a preform, comprising a furnace for melting one end of the preform, from which the optical fiber is drawn, and an optical sensor at the exit from the furnace for measuring the diameter of the optical fiber for the purpose of adjusting the drawing speed and tension.

2. Description of the Prior Art

In a device of the above kind the preform is generally made of silica and is moved slowly in translation inside the furnace. The Latter provides the energy needed to melt a drawing cone at one end of the preform from which the optical fiber is drawn by drawing means.

The diameter of the optical fiber depends on the drawing speed and the drawing tension applied to the optical fiber by the drawing means. In an arrangement known in itself the optical sensor is disposed at the exit from the furnace to monitor the formation of the optical fiber and to adjust the drawing speed and the drawing tension rapidly to guarantee a diameter inside the range of tolerances.

If the optical sensor detects a fiber diameter outside the range of tolerance, indicating a defect, the optical fiber is cut on opposite sides of the measurement point. At present an optical fiber must have over a length of 2.2 kilometers (km) a minimum tolerance in respect of the diameter of plus or minus 2 microns ($\mu$m) for a mean diameter of 125 $\mu$m. Future requirements will be for a minimal commercial length of 5 km and a tolerance of plus or minus 1 $\mu$m.

The optical sensor measures the diameter using a principle known in itself and consisting in illuminating the optical fiber by means of a light source and measuring the shadow projected by the diameter of the optical fiber onto a photodiode receiver. The sensor therefore has the advantage of a measurement point with no mechanical contact. The shadow is generated dynamically by scanning a laser beam to and fro across the optical fiber at a frequency of 1 000 Hertz (Hz) for example. The measured diameter is therefore free of any uncertainty due to vibration of the optical fiber between the furnace and the drawing means, at a frequency typically less than 10 Hz.

The measurement accuracy of the optical sensor must be related to the range of tolerances so as not to cause the fiber to be cut as a consequence of measurement artifacts. Tests carried out on site using a device of the type just described showed that the accuracy of measurement of the diameter of the optical fiber as measured during drawing was incompatible with the drawing process, being some five times worse than the accuracy achieved in tests carried out off-site with the same optical sensor and samples of the same optical fiber. The expression "off-site" means with the optical sensor disposed away from the fiber drawing device, the samples being immobile in front of the optical sensor.

The aim of the invention is to improve the measurement accuracy of an optical sensor near the furnace of a drawing device.

SUMMARY OF THE INVENTION

To this end, the invention consists in a device for drawing an optical fiber from a preform, comprising a furnace for melting one end of the preform from which the optical fiber is drawn and an optical sensor disposed at the exit from the furnace to measure the diameter of the optical fiber in order to adjust the drawing speed and the drawing tension, wherein the optical sensor is surrounded by a mask forming a dark chamber through which the optical fiber passes.

Other features and advantages of the invention will become apparent upon reading the description of one embodiment of the invention illustrated by the drawings.

DETAILED DESCRIPTION OF THE PREFERRED EMBODIMENT

Figure 1:
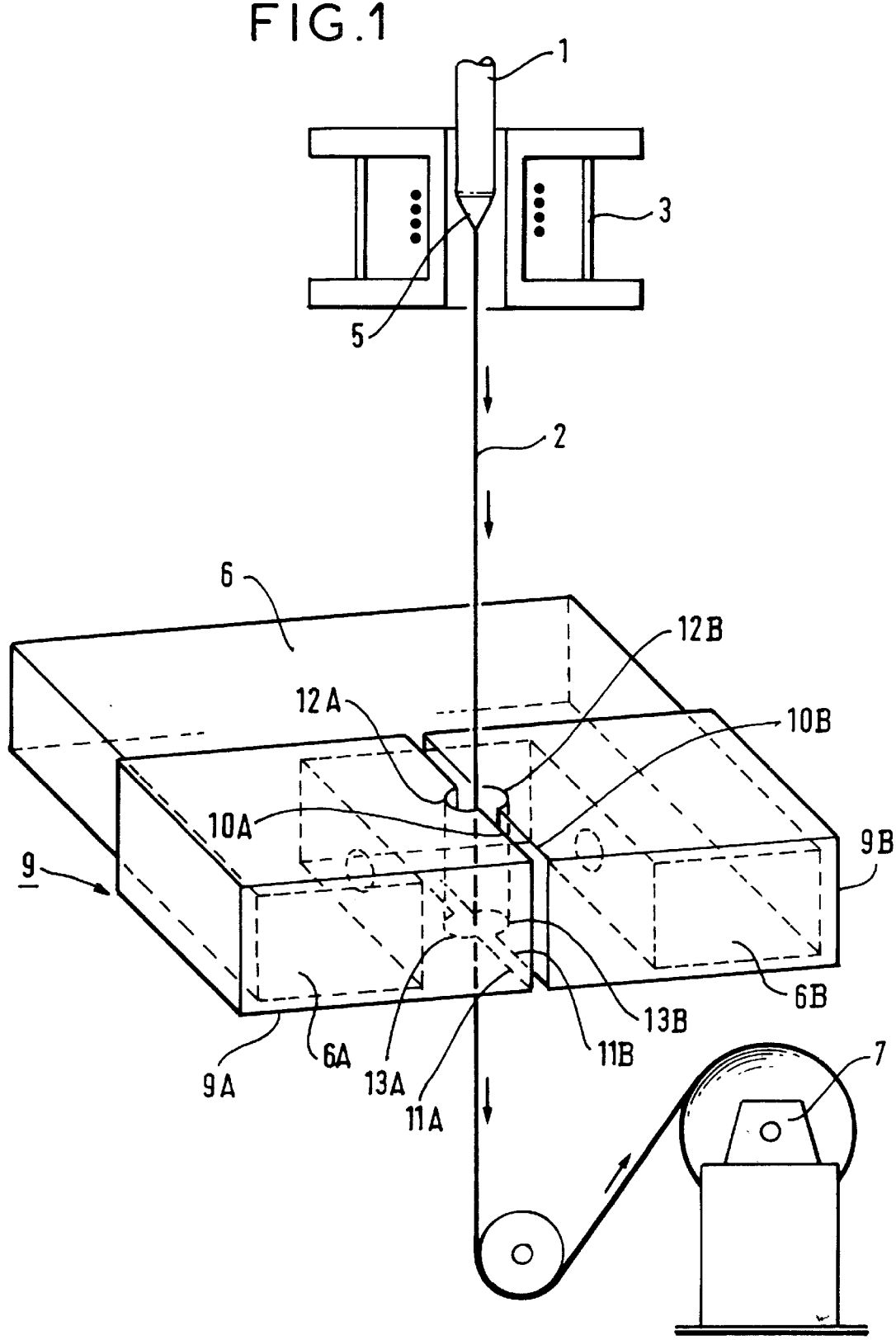
FIG. 1 is an overall view of the device of the invention.

As shown in FIG. 1, the device of the invention comprises a preform 1 generally made of silica and moved slowly in translation in a furnace 3, for example an induction furnace. The furnace applies energy at a temperature of around 2000 degrees Celsius to melt one end of the preform in contact with a drawing cone 5 from which an optical fiber 2 is drawn by drawing means 7.

An optical sensor 6 is disposed less than 100 centimeters (cm) from the exit from the furnace. The furnace and the optical sensor are 40 cm apart, for example. The optical sensor has two branches 6A and 6B, for example, forming an airgap in which the optical-fiber drawn from the drawing cone moves. The operation of the optical sensor is based on the principle known in itself described previously of measuring the shadow.

A mask 9 made of a material that is not transparent to luminous radiation from infrared through ultraviolet surrounds at least the two branches of the optical sensor. It forms a dark chamber through which the optical fiber passes.

The mask preferably comprises two parts 9A and 9B mobile relative to the two branches of the optical sensor. The two parts are joined at two pairs of edges 10A and 10B and 11A and 11B. Two orifices are formed in the mask through which the optical fiber passes and each of which comprises two semi-circular holes 12A and 12B, respectively 13A and 13B, formed on the two edges.

Exterior light rays falling on the optical sensor, and especially rays emitted by the furnace, are reflected or absorbed by the two parts 9A and 9B of the mask forming the dark chamber.

Figure 2:
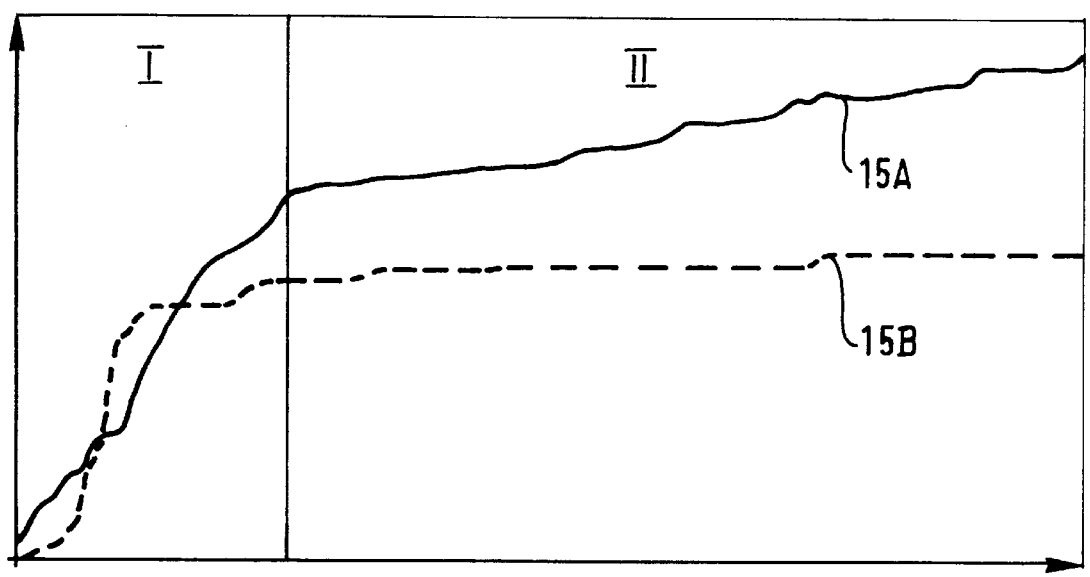
FIG. 2 shows comparative results of experimental measurement of cumulative defects detected by an optical sensor for a prior art device and for a device of the invention.

FIG. 2 shows comparative results of experimental measurement of cumulative defects detected by an optical sensor a prior art device and for a device of the invention. The length of optical fiber is plotted along the horizontal axis and cumulative faults detected per unit length by means of a shadow measuring-optical sensor as described previously are plotted along the vertical axis. Cumulative defects departing from the mean diameter of the optical fiber by 1 $\mu$m or more are plotted on a curve 15A (higher values) and on a curve 15B (lower values). Both curves show high accumulation of defects in a portion I of the curves obtained with no mask and low accumulation of defects in a portion II of the curves obtained with the mask surrounding the optical sensor.

The curves show a clear improvement in the optical fiber diameter measurement accuracy in a device in accordance with the invention. The mask protects the optical sensor from radiation from ambient light sources, in particular rays emitted by the drawing furnace, which cause localized measurement artifacts. It improves the optical fiber diameter measurement accuracy which, by eliminating artifacts, leads to a reduction in the number of times the optical fiber is cut.

What is claimed is:

1. A device for drawing an optical fiber from a preform, comprising a furnace for melting one end of said preform from which said optical fiber is drawn and an optical sensor disposed at the exit from said furnace to measure the diameter of said optical fiber in order to adjust the drawing speed and the drawing tension, wherein said optical sensor is surrounded by a mask forming a chamber through which said optical fiber passes such that said mask protects said optical sensor from radiation from ambient light sources.

2. The device claimed in claim 1 wherein said mask comprises two parts mobile relative to two branches of said optical sensor.

3. The device claimed in claim 1 wherein said furnace and said optical sensor are less than 100 cm apart.

4. The device claimed in claim 1 wherein said mask is made of a material that is not transparent to light rays from infrared through ultraviolet.

* * * * *